(No Model.) 3 Sheets—Sheet 1.
G. H. REYNOLDS.
VALVE FOR HYDRAULIC ELEVATORS, &c.
No. 314,720. Patented Mar. 31, 1885.
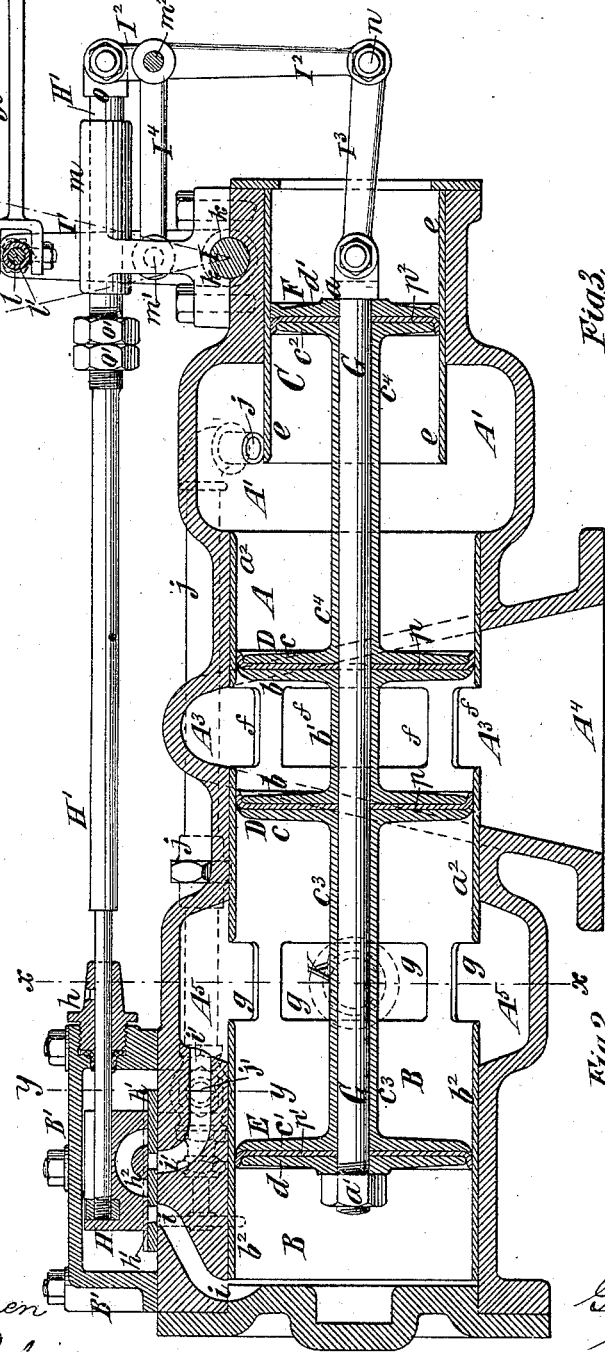
Fig.1.
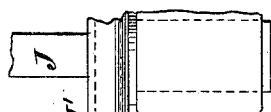
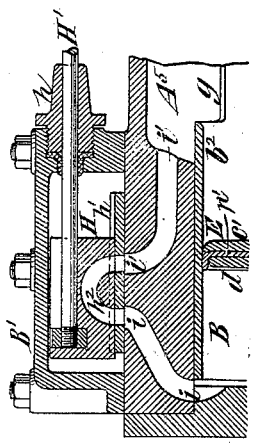
Fig.2.
Fig.3.
Witnesses:
C. Sundgren
E. C. Perkins
Inventor:
Geo. H. Reynolds
by his attys
Brown & Hall

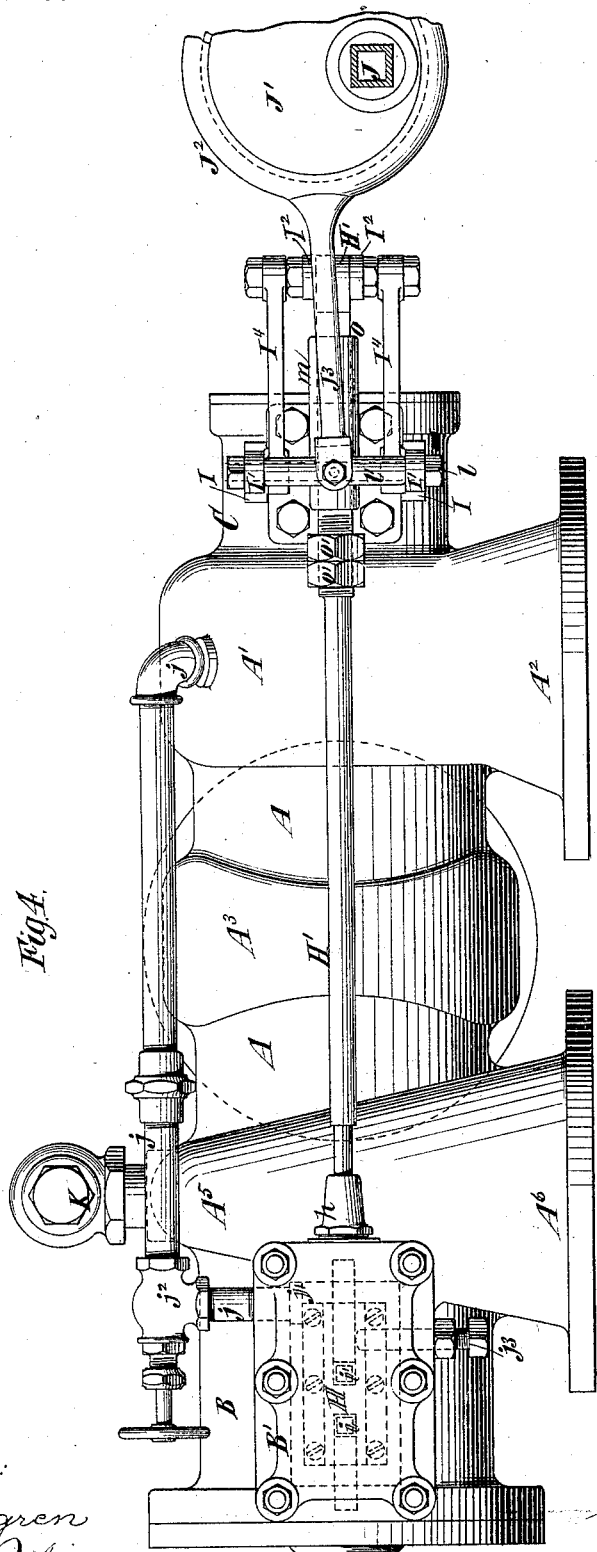

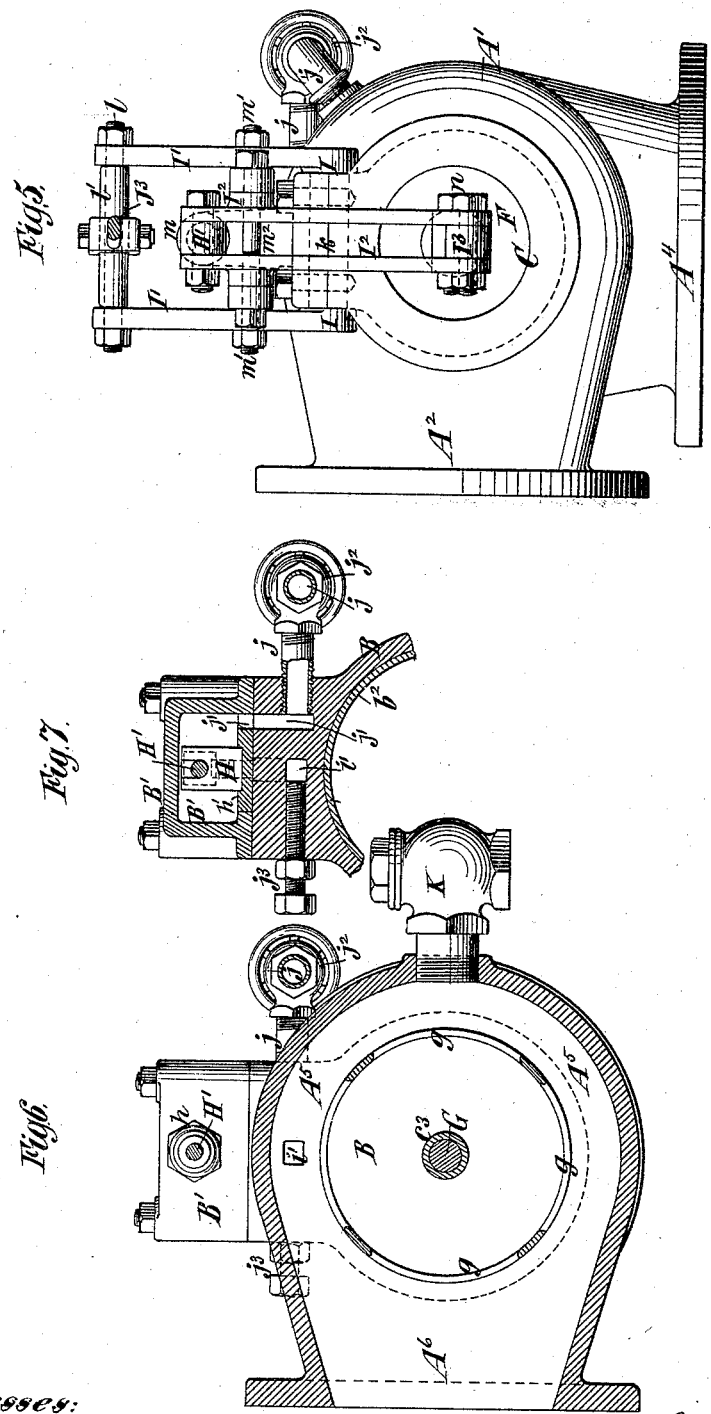

UNITED STATES PATENT OFFICE.

GEORGE H. REYNOLDS, OF NEW YORK, N. Y., ASSIGNOR OF ONE-HALF TO CRANE BROTHERS MANUFACTURING COMPANY, OF CHICAGO, ILLINOIS.

VALVE FOR HYDRAULIC ELEVATORS, &c.

SPECIFICATION forming part of Letters Patent No. 314,720, dated March 31, 1885.

Application filed November 6, 1884. (No model.)

*To all whom it may concern:*

Be it known that I, GEORGE H. REYNOLDS, of the city and county of New York, in the State of New York, have invented a new and useful Improvement in Valves for Hydraulic Elevators and other Purposes, of which the following is a specification.

My invention relates more particularly to a valve for controlling the supply of water under pressure to the operating-cylinder of a hydraulic elevator to produce the rising movement of the elevator car, cab, or platform, and the exhaust or discharge of water from such operating-cylinder to permit the descent of the car, cab, or platform; but the invention is also applicable for controlling the flow of liquid to and from the cylinders of other machines comprising pistons or rams which are operated by the pressure of liquid.

The invention relates to a valve which is moved by the pressure of water or other liquid acting upon it and upon a controlling piston or pistons with which the said valve is combined, the pressure of water upon the controlling piston or pistons being controlled by an auxiliary or pilot valve, which may be shifted directly and with small force by the operator in the elevator car or cab. By the admission of water under pressure to act upon said controlling piston or pistons or the release of water which has acted upon said piston or pistons the auxiliary valve indirectly produces the movement of the main valve.

In order to enable my invention to be more easily understood, I will first briefly describe an apparatus which embodies all the features of my invention in a very desirable and effective form.

The valve which I now prefer to employ is a piston-valve movable lengthwise in a cylinder or casing, and having combined with it and secured rigidly upon the same rod two controlling-pistons—one each side of the valve. One controlling-piston is or may be of the same or about the same size as the valve, and this I shall hereinafter term the "larger controlling-piston." The other controlling-piston is of a size or area smaller than the main valve, and this I shall hereinafter term the "smaller controlling-piston." The main valve and the two controlling-pistons, rigidly connected and movable together, as described, are arranged in three cylinders, which are in line and are or may be constructed in the same casting or casing. In this casing is an annular belt having a side opening or throat, which is to be connected with the operating-cylinder and communicating with the interior of the cylinder by a circular series of openings, forming a port over which the main valve may be moved to one or other side thereof, and which will be entirely covered or closed by the main valve when shifted to an intermediate position. The main valve may consist of a single piston of a length sufficient to cover the said port, or of two piston-heads placed at such a distance apart as to cover or straddle the said port when brought to an intermediate position. This port I may term the "working-port," inasmuch as through it water passes under pressure to the operating-cylinder, or from the operating-cylinder to the discharge. On one side of the working-port, and between it and the smaller controlling-cylinder, the casing is constructed with a supply-belt having a laterally-presented throat or nozzle, to which the supply-pipe is connected, and consequently the full working-pressure always acts in opposite directions on the piston-valve and smaller controlling-piston. On the other side of the working-port and between it and the larger controlling-cylinder is a discharge-belt having a laterally-presented throat or nozzle, with which the discharge-pipe is to be connected and which communicates with the atmosphere, and consequently the main valve and the larger controlling-piston on their adjacent sides are virtually as free from pressure as if acted on only by the atmosphere. In a valve-chest upon the larger controlling-cylinder is an auxiliary or pilot valve, which may consist of a simple slide-valve, and in the chest is the full working-pressure of water, which may be supplied thereto by a pipe from the supply-belt before referred to. From the outer end of the larger controlling-cylinder ports or passages lead to the valve-chest, and in the auxiliary valve is a cove or passage, which, when the valve is moved to the proper position, places the said ports or passages in communication and allows the water in the outer end of the larger controlling-cylinder to escape into the discharge-space or to the atmosphere, thereby freeing the larger controlling-piston entirely from pressure on either side thereof. When the auxiliary valve is moved to expose the port which leads from the valve-chest to the outer end of the larger controlling-cylinder, the water passes from the valve-chest into said cylinder, and the outer side of the larger controlling-piston is subjected to the full working-pressure.

The devices through which the operation of the elevator is controlled from the car or cab are connected with the auxiliary valve, and said valve is also preferably connected with and operated automatically by the moving pistons and main valve before described.

The operation of the parts above described is very simple. Suppose, for example, that the main valve is in its intermediate position covering the working-port, and that it is desired to have the elevator car or cab ascend. The auxiliary valve is shifted by the operator so as to place the outer end of the larger controlling-cylinder in communication with the discharge, thereby freeing the larger controlling-piston entirely of pressure. This being done the pressure on the main valve overbalances the pressure on the smaller controlling-piston and the main valve is moved so as to open the working-port to the water-supply and thereby to admit water to the operating-cylinder. During such movement of the main valve and pistons the auxiliary valve is moved automatically in the reverse direction, and by the time the main valve has moved to the position described the auxiliary valve has cut off communication between the outer end of the larger controlling-cylinder and the discharge, and the main valve and pistons come to a standstill, with the full working-pressure on the operating-cylinder. When it is desired to stop the car and descend, the auxiliary valve is moved so as to admit water from its chest to the outer end of the larger controlling-cylinder. The pressure in one direction on the larger controlling-piston now counterbalances the pressure in the reverse direction on the main valve, and the pressure on the smaller controlling-piston being unbalanced the latter will produce the movement of the main valve and pistons in a direction to cut off communication between the supply and the working-port and establish communication between the working-port and the discharge-space, whereupon the car or cab will descend.

The invention consists in novel combinations of parts and details of construction, hereinafter described, and pointed out in the claims.

In the accompanying drawings, Figure 1 represents a longitudinal central section of an apparatus of the kind above described, all parts being shown in their central position. Fig. 2 is a sectional view of the auxiliary valve adjusted to place the outer end of the larger controlling-cylinder in communication with the discharge. Fig. 3 is a view similar to Fig. 2, showing the auxiliary valve adjusted to admit the full working-pressure to act on the outer end of the larger controlling-piston. Fig. 4 is a plan of the apparatus corresponding to Fig. 1. Fig. 5 is an end elevation looking from the right hand of Fig. 1. Fig. 6 is a transverse section on the plane of the dotted line $x$ $x$, Fig. 1; and Fig. 7 is a partial transverse section on the plane of the dotted line $y$ $y$, Fig. 1.

Similar letters of reference designate corresponding parts in all the figures.

A designates the cylinder for the main valve.

B designates the larger controlling-cylinder at one end thereof, and C designates the smaller controlling-cylinder at the other end thereof. All these cylinders are in line, and as here shown are formed integral with each other, all being constructed in the same cast-metal casing.

D D designate the two piston-heads which constitute the main valve, and rigidly connected with and movable with the said main valve are a larger controlling-piston, E, fitting the cylinder B, and a smaller controlling-piston, F, fitting the cylinder C. The main valve D and pistons E F are constructed and connected in a novel and simple manner. (Shown clearly in Fig. 1.)

G designates a rod or bolt provided at one end with a shoulder or head, $a$, and at the other end with a nut, $a'$. The piston-heads D of the main valve are each composed of two disks or plates, $b$ $c$, and an interposed leather or other packing, $p$. The larger controlling-piston E is composed of two disks or heads, $c'$ $d$, and an interposed leather or other suitable packing, $p'$, and the smaller controlling-piston F is composed of two disks or heads, $c^2$ $d'$, and an interposed packing, $p^2$. The disks or plates $b$ of the main valve D are connected by and cast integral with a sleeve or tubular stretcher, $b'$, the disks $c$ $c'$ are connected by a similar sleeve, $c^3$, and the disks $c$ $c^2$ are connected by a similar sleeve, $c^4$. In assembling these parts they are all strung or placed on the rod G in proper order, and the nut $a'$ is then screwed up to tighten and hold them all in place. As here shown, the smaller controlling-cylinder C is provided with a lining, $e$, of brass to prevent corrosion, and the valve-cylinder A and larger controlling-cylinder are likewise provided with linings $a^2$ $b^2$, which, as here shown, are made in one piece, the two cylinders being of equal size.

Between the main-valve cylinder A and smaller controlling-cylinder C the metal casing is constructed with an annular belt or enlargement, A', from which leads a side opening or throat, A², with which a supply-pipe is to be directly connected. Consequently, it will be understood that the water-pressure is continually acting on the right-hand end of the main valve D and the left-hand end of the smaller controlling-piston F.

At about the middle of the length of the main-valve cylinder A the casing is constructed with a belt, A³, having an opening or nozzle, A⁴, here shown as presented downward and communicating with the valve-cylinder A by a circular series of openings, $f$, in the lining $a^2$. The nozzle A⁴ is to be connected with the operating-cylinder of the elevator, (not here shown,) and through the port formed by the openings $f$ the water passes either to or from the operating-cylinder, according to the position of the main valve D. The port $f$ I term the "working-port" or "valve-port."

Between the port $f$ and the large controlling-cylinder B the casing is constructed with a discharge-belt, A⁵, having a laterally-presented nozzle or opening, A⁶, with which is to be connected the discharge-pipe, through which the water is discharged freely to the atmosphere or to the suction of a pump, and consequently it will be understood that there is no pressure exerted on the left-hand end of the main valve D or on the right-hand or inner side of the larger controlling-piston E. The belt A⁵ is in free communication through openings $g$ in the linings $a^2$ $b^2$ with the space between the valve D and piston E; but, if desired, the two linings might be separate and a space left between them.

On the larger controlling-cylinder B is an auxiliary valve-chest, B', wherein is arranged an auxiliary or pilot valve, H, operated by a rod, H', which extends through a stuffing-box, $h$, in the end of the chest B'. As here shown, the valve H consists of a simple slide working on the seat $h'$, and having in its under side a cove or passage, $h^2$.

From the outer end of the controlling-cylinder B a port or passage, $i$, extends to the valve-seat $h'$, and from said seat a second port or passage, $i'$, extends to the discharge-space A⁵ or to the atmosphere, which is practically the same thing.

The valve-chest B' is supplied with water of the same working-pressure as that which is in the supply-space A', in any suitable manner. As here shown, a pipe, $j$, extends external to the casing from the supply-space A' to the side of the projection on the cylinder B, on which the chest B' is secured, as is best shown in Figs. 4, 5, and 7. The pipe $j$ communicates with a passage, $j'$, cored in the casing, as shown in Fig. 7, and the water therefrom enters the valve-chest B', and is supplied constantly thereto when the port $i$ is uncovered. The pipe $j$ might be introduced directly into the chest B'; but the plan here shown is preferable, because the chest B' may then be taken off without disconnecting or disturbing the pipe $j$. On the pipe $j$ is a valve, $j^2$, whereby the passage of water through it may be controlled.

It is not necessary that the water supplied to the chest B' be of exactly the same pressure as that supplied to the space A'; but that plan is preferable, as then the pressure on the controlling-piston E toward the right will exactly counterbalance the pressure on the main valve D toward the left hand.

In Fig. 1 the auxiliary valve H is shown in its intermediate position; but I have shown it in Fig. 2 as shifted to place the ports or passages $i$ $i'$ in communication through the passage $h^2$ with the discharge-space A⁵, thus providing for the free exhaust into the discharge-space A⁵ of the water in the larger controlling-cylinder B on the outer side of the piston E.

In Fig. 3 I have shown the auxiliary valve H as shifted to uncover the port $i$ and to permit the passage of water from the valve-chest B' into the outer end of the larger controlling-cylinder B under full supply pressure. Of course speed of movement of the main valve will vary according to the rapidity of flow of the water through the port $i$ from the chest B', or through the ports $i$ $i'$ to the discharge-space A⁵. The flow of water under pressure into and through the port $i$ may be regulated by the valve $j^2$, and I have here represented a set-screw, $j^3$, as inserted transversely into the port $i'$, (shown most clearly in Figs. 6 and 7,) and capable of adjustment to more or less close the said port and so throttle the water in its passage through said port.

I will now describe the means here represented for shifting the auxiliary valve H, both independently through the devices controlled by the elevator-operator in the car or cab, and automatically from the moving main valve D and controlling-pistons.

I designates a rock-shaft supported in a bearing, $k$, near the end of the casing, and provided at opposite ends with arms or levers I', extending upward and connected at their upper ends by a rod or bolt, $l$, and a sleeve or thimble, $l'$, placed between them to hold them at the required distance apart. With the rod or bolt $l$ are connected the devices whereby the valve is to be controlled from the car or cab. These devices may be of any suitable character; but I prefer to employ devices of the kind shown and described in my application for Letters Patent filed November 4, 1884, and the serial number of which is 147,164. I have here represented only a part of such devices.

J designates a vertical shaft or rod, here shown as square, and extending from top to bottom of the elevator-shaft. Upon the car or cab is a sleeve which slides freely over the rod J as the car rises and falls, but which may be turned at any point in the lift by the operator, and which being turned transmits the turning to the square or other rod or shaft J. On the lower end of the shaft or rod J is an eccentric, J', the strap or hoop J² of which is connected by a rod, J³, with the upper ends of the levers I', and serves to shift them, as shown by the dotted lines in Fig. 1. The valve-rod H' slides through and is guided by a bearing, $m$, and at its outer end it has connected with it a lever, I², which may consist of two pieces, as shown in Fig. 5, or of a single forked piece, as may be desired. The lower end of the lever I² is connected with a link or rod, I³, with the moving rod which connects the main valve and controlling pistons, and, as here shown, the head $a$ of the bolt or rod G, before referred to, is forked to receive the end of the link or rod I³. The lever I² is connected between its ends with the levers or arms I', between the ends of the latter, by rods or links I⁴, connected by pivots or pins $m'$ with the levers or arms I', and by a pivot-pin or bolt, $m^2$, with the lever I². The arrangement and manner of connecting these several levers and rods are best seen in Figs. 1, 4, and 5. During the automatic operation of the auxiliary valve H the pin or pivot $m^2$ forms the fulcrum on which the lever I² rocks, and whereby it is caused to move the valve-rod H' and auxiliary valve H always in a reverse direction to the movement of the main valve and controlling-pistons. When, however, the auxiliary valve is operated independently through the levers I', the point of connection $n$ between the lower end of the lever I² and the link or rod I³ becomes the fulcrum on which the whole system of levers and rods are moved to shift the valve H directly in one direction or the other.

In order to limit the movement of the auxiliary valve H when shifted independently, I provide a shoulder, $o$, and nuts $o'$ on the rod H' at opposite ends of the bearing $m$, and the said shoulder and nuts form stops to limit the movement of the valve and rod H H'.

The operation of the apparatus is very simple.

In the drawings, Figs. 1 and 4, the parts are all represented as intermediate between their two extreme positions, and the main valve D covers the port $f$. Suppose, for example, that it is desired to raise the elevator car or cab, the operator turns the rod J, and by shifting the levers I' from the position shown in Fig. 1 to the position indicated by the dotted line $s$ in said figure, he shifts the auxiliary valve H to the position shown in Fig. 2, thereby placing the ports $i\,i'$ in direct communication with each other, and providing for the free escape of water from the left-hand side of the larger controlling-piston E, through the ports and passages $i\,h^2\,i'$, to the discharge-space A⁵; hence the controlling-piston E is entirely freed from pressure, and the main valve D and controlling-pistons are moved toward the left by the unbalanced pressure on the right hand of the main valve D due to the excess in area of the said valve over the area of the smaller controlling-piston F. By this movement of the main valve the supply-space A' is placed in direct communication with the working-port or valve-port $f$, and so water passes to the operating-cylinder. During the movement of the main valve and pistons, as described, the auxiliary-valve has been moved automatically toward the right, and has cut off communication between the ports $i\,i'$, and the main valve thereupon stops. Starting again with the main valve in position shown in Fig. 1, I will suppose that it is desired to allow the car or cab to descend. By turning the rod or shaft J the operator shifts the levers I' from the position shown by full lines in Fig. 1 to the position indicated by the dotted line $s'$. By so doing the auxiliary valve H is shifted to the position shown in Fig. 3, uncovering the port $i$, and allowing water under pressure to pass from the chest B' down through the port $i$ and into the larger controlling-cylinder B on the outer or left-hand side of the piston E therein. The pressure on the piston E toward the right is exactly counterbalanced by the pressure on the main-valve D toward the left, (if the piston and main valve are of the same size,) and hence the main valve and pistons are moved toward the right by the pressure on the smaller controlling-piston F, the port $f$ is placed in communication with the discharge-space A⁵ through the port or openings $g$, and the water is allowed to pass from the operating-cylinder through the ports $f$ and $g$ to the discharge-space A⁵. As the main valve and pistons are moved toward the right hand, the auxiliary valve is moved automatically toward the left hand and has closed the port $i$ when the main valve D has placed the ports $f$ and $g$ in communication.

When it is desired to have the main valve come to a neutral position to stop the elevator-car, the levers I' are moved to the positions shown by full lines in Fig. 1. When it is desired to ascend at full speed, the levers I' are brought to the positions indicated by the dotted line $s$, Fig. 1, and the auxiliary valve H thereby shifted to the position shown in Fig. 2; and when it is desired to descend at full speed the levers I' are shifted to the positions indicated by the dotted line $s'$ in Fig. 1, and the auxiliary valve H thereby shifted to the position shown in Fig. 3. If it is desired to have the same pressure applied to move the valve D in opening and closing, and the cylinders A B are of the same size, I make the smaller controlling cylinder and piston C F just half the area of the main-valve cylinder and valve A D.

In order to prevent the formation of a vacuum in the discharge-space or belt A⁵, I may apply thereto an inwardly-opening air-check valve, K, as shown in Figs. 4 and 6.

What I claim as of my invention, and desire to secure by Letters Patent, is—

1. The combination, with a main-valve cylinder, with its working port and the larger and smaller controlling-cylinders on opposite sides thereof, the supply-passage between the valve-cylinder and smaller controlling-cylinder, and the discharge-passage between the smaller controlling-cylinder and the valve-cylinder and the larger controlling-cylinder, of the main valve and controlling pistons fitting said cylinders and an auxiliary valve for controlling the passage of water under pressure to the outer end of the larger controlling-cylinder and its exhaust therefrom, substantially as herein described.

2. The combination, with the casing comprising the valve-cylinder and controlling-cylinders A B C, and the supply, working, and discharge belts and ports A' A³ f A⁵ g, of the main valve D and larger and smaller controlling-pistons E F on opposite sides thereof, and an auxiliary valve for controlling the supply of water to and the exhaust of water from the outer end of the controlling-cylinder B, substantially as herein described.

3. The combination, with the casing comprising the valve-cylinder and its port, the larger and smaller controlling-cylinders on opposite sides thereof, the intermediate supply and discharge spaces, and the ports $i$ $i'$, of the main valve and larger and smaller controlling-pistons fitting said cylinders, an auxiliary valve-chest and an auxiliary valve for controlling the said ports $i$ $i'$, and a pipe or passage for supplying fluid under pressure to the auxiliary valve-chest, substantially as herein described.

4. The combination, with the casing comprising the valve-cylinder with its port, the larger and smaller controlling-cylinders, the intermediate supply and discharge spaces, A' A³, the ports $i$ $i'$, and the chest B', of the main valve and controlling-pistons, the auxiliary valve controlling the ports $i$ $i'$, and a pipe or passage for conducting water under pressure from the said supply-space to the valve-chest B', all substantially as herein described.

5. The combination, with the casing comprising the valve-cylinder A, the controlling-cylinders B C, the intermediate supply and discharge spaces, the ports $i$ $i'$, and the passage $j'$, of the main valves and controlling-pistons D E F, the valve-chest B', the auxiliary valve H, and a pipe or passage, $j$, leading from the supply-space to the cavity or passage $j'$, for admitting water under pressure to the valve-chest B', substantially as herein described.

6. The combination, with a main-valve cylinder with its working-port and the larger and smaller controlling-cylinders on opposite sides thereof, the supply-passage between the smaller controlling-cylinder and the valve-cylinder, and the discharge-passage between the larger controlling-cylinder and the valve-cylinder, of the main valve and controlling-pistons fitting said cylinders, an auxiliary valve for controlling the passage of water under pressure to the outer end of the larger controlling-cylinder and its exhaust therefrom, connections through which said auxiliary valve is operated automatically by the moving main valve and controlling pistons, and connections through which the auxiliary valve may be shifted by the operator independently of its automatic movement, substantially as herein described.

7. The combination, with a main valve and its cylinder and controlling pistons and cylinders on opposite sides thereof, as described, of an auxiliary valve for controlling the supply of water to and its exhaust from the outer end of the larger controlling cylinder, a lever through which said auxiliary valve is operated automatically by the moving main valve and controlling-pistons and which is fulcrumed between its ends, and connections through which the fulcrum of said lever and the auxiliary valve may be shifted by the operator independently of the automatic movement of the valve, substantially as herein described.

8. The combination, with a main valve and cylinder and a controlling piston and cylinder connected therewith, and an auxiliary valve for controlling the admission of water to and its exhaust from the controlling-cylinder, of the lever I² and rod I³, connecting the auxiliary valve-stem and the piston-rod, the rock-shaft I and levers I', the rods or links I⁴, connecting the levers I' and I², and connections whereby the levers I' and parts connected therewith may be shifted by the operator, substantially as herein described.

GEO. H. REYNOLDS.

Witnesses:
 FREDK. HAYNES,
 EMIL SCHWARTZ.

It is hereby certified that in Letters Patent No. 314,720, granted March 31, 1885, upon the application of George H. Reynolds, of New York, New York, for an improvement in "Valves for Hydraulic Elevators, &c.," an error appears in the printed specification requiring correction, as follows: In line 127, page 4, the words "smaller controlling-cylinder and the" should be stricken out; and that the proper correction has been made in the records pertaining to the case in the Patent Office, and should be read in said Letters Patent to make the same conform thereto.

Signed, countersigned, and sealed this 7th day of April, A. D. 1885.

[SEAL.]

H. L. MULDROW,
*Acting Secretary of the Interior.*

Countersigned:
   M. V. MONTGOMERY,
      *Commissioner of Patents.*